(12) United States Patent
Foch et al.

(10) Patent No.: US 6,597,154 B2
(45) Date of Patent: Jul. 22, 2003

(54) ELECTRICAL ENERGY DISTRIBUTION SYSTEM AND CONTACTOR FOR SUCH A SYSTEM

(75) Inventors: Etienne Foch, Toulouse (FR); Christophe Lochot, Blagnac (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/022,280

(22) Filed: Dec. 20, 2001

(65) Prior Publication Data

US 2002/0125862 A1 Sep. 12, 2002

(30) Foreign Application Priority Data

Dec. 21, 2000 (FR) .............................................. 00 16758

(51) Int. Cl.[7] ................................................. G05F 1/70
(52) U.S. Cl. ...................................................... 323/205
(58) Field of Search ........................... 323/205; 307/51, 307/70, 80; 361/107

(56) References Cited

U.S. PATENT DOCUMENTS

| 3,876,886 | A | * | 4/1975 | McClain et al. ............... 307/51 |
| 4,384,213 | A | * | 5/1983 | Bogel ........................... 307/64 |
| 5,751,524 | A | * | 5/1998 | Swindler ....................... 361/42 |
| 5,894,413 | A | | 4/1999 | Ferguson ...................... 363/65 |

FOREIGN PATENT DOCUMENTS

WO 0013290 3/2000

* cited by examiner

*Primary Examiner*—Adolf D. Berhane

(57) ABSTRACT

According to the invention, the common control device (26) for the power and interconnection contactors (9, 10, 11) is a programmable computer operating according to a truth table, without prior checking of the state of said contactors, and, with each interconnection contactor (11) there is associated a device (25) able to prevent the closure of said contactor if its contact terminals (11a, 11b) are simultaneously energized.

5 Claims, 3 Drawing Sheets

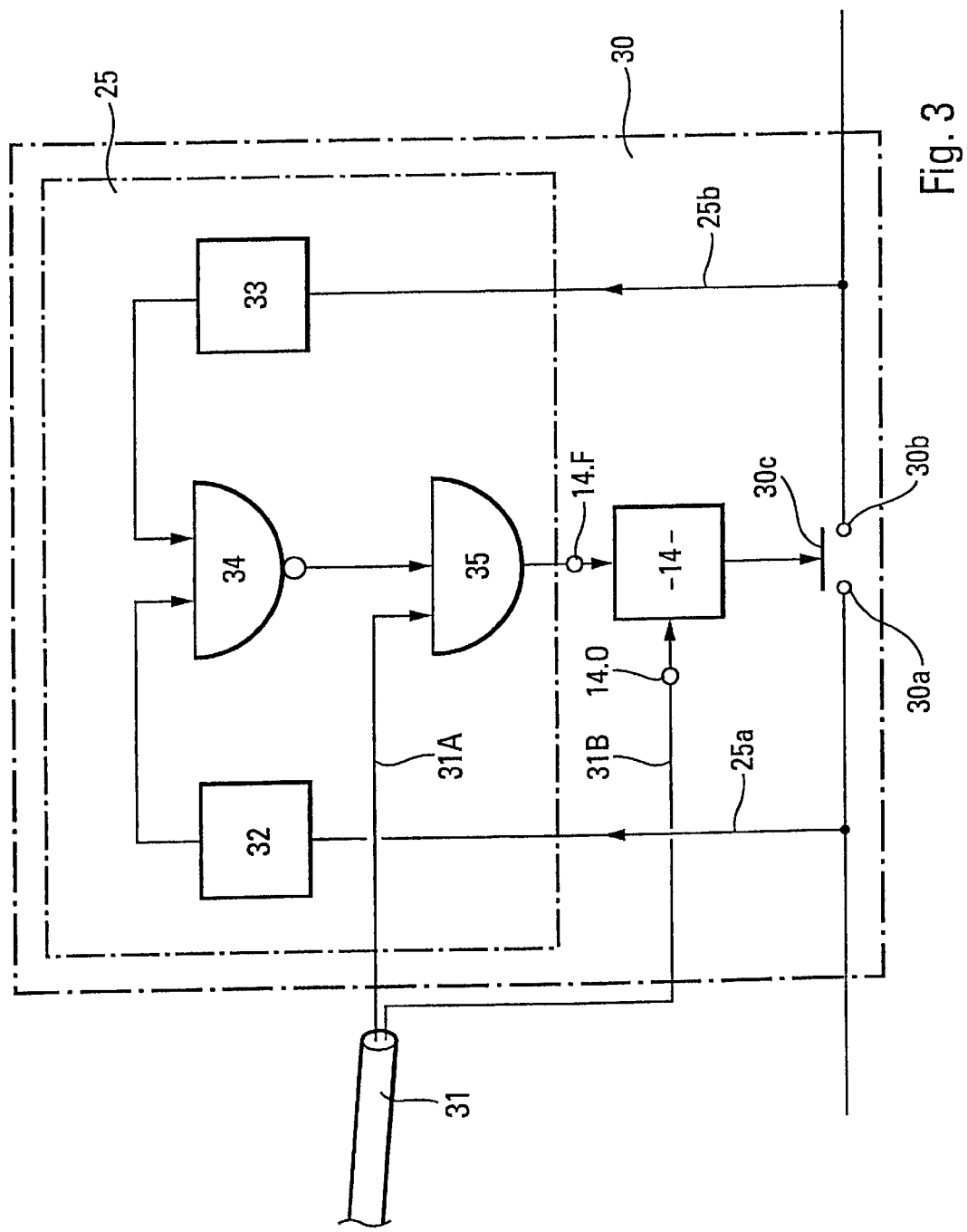

ELECTRICAL ENERGY DISTRIBUTION SYSTEM AND CONTACTOR FOR SUCH A SYSTEM

BACKGROUND

The present invention relates to electrical energy distribution systems, as well as to the contactors for such systems.

Electrical energy distribution systems are already known which comprise:

- at least two distribution circuits, with each of which is associated an electrical power source powering the corresponding distribution circuit through a controllable power contactor;
- at least one controllable interconnection contactor, able to interlink said distribution circuits on that side of said power contactors which is away from said power sources; and
- a common control device for the set of said contactors.

Thus, in such a system, each distribution circuit is powered by its own source through the corresponding power contactor, but, should a source be defective, said corresponding distribution circuit can be powered by the source of at least one other distribution circuit, through at least one interconnection contactor.

Distribution systems of this type are used in particular on board aircraft. In this case, each distribution circuit generally comprises a conducting distribution bar powering in parallel a plurality of electrical loads and each source consists either of a generator, driven by an engine of the aircraft or by an auxiliary power unit, or consists of batteries, or else of AC/DC or DC/AC transformers.

Such known electrical energy distribution systems have some drawbacks. Specifically, in order to avoid any untimely coupling of the power sources at the moment of the switching of an interconnection contactor, these known systems, which continuously detect the closed or open state of each contactor, are obliged to wait for the confirmation of the opening of the power contactor associated with the defective source before closing the interconnection contactor or contactors. Hence, this results in sequential operation imposing limits on the speed of switching of said contactors. Moreover, such permanent detection of the state of each contactor entails the existence of wire links between said contactors and the control device, thereby increasing the weight and the cost of said systems.

The object of the present invention is to remedy these drawbacks. It relates to a distribution system of the above-mentioned type, improved in such a way as to benefit from greater speed of operation and to allow the elimination of the links between the various contactors and the common control device.

Accordingly, according to the invention, the electrical energy distribution system of the type recalled hereinabove is noteworthy in that:

- said common control device is a programmable computer opening and closing said power and interconnection contactors, without prior checking of the open or closed state of said contactors, according to a truth table indicating, for each possible combination of the operating states, correct or defective, of said electrical power sources, the open or closed state which each of said power and interconnection contactors must take; and
- with each interconnection contactor there is associated a prevention device able to prevent the closure of said interconnection contactor if its contact terminals are simultaneously energized.

Thus, should a power source be defective, the operation of the control device is no longer sequential and the latter can immediately instigate the switchings necessary for powering the circuit linked to the defective source without concerning itself with the state of said contactors. However, safety is complete since no possibility of coupling of power sources exists, owing to the action of said closure prevention devices.

Preferably, also to avoid any possibility of coupling of sources at the moment of cutting a source into circuit, for example after switching a source on or off, there is provision that, with each power contactor, there is also associated a prevention device, able to prevent the closure of said power contactor, if its contact terminals are simultaneously energized.

In the usual case where said common control device is linked to each of said power contactors and interconnection contactor by an opening control line and by a closure control line, said prevention device associated with such a contactor is interposed in said closure control line of this contactor. Such a prevention device can comprise:

- two voltage detectors, respectively linked to said terminals of the corresponding contactor; and
- a logic device, linked to said closure control line and to said voltage detectors and preventing the closure of the corresponding contactor if its contact terminals are simultaneously energized.

Although the prevention device can form an add-on unit to a contactor of known type, it is often preferable for said prevention device and said contactor to form a single constructional unit.

SUMMARY

The present invention therefore relates, moreover, to an electrical contactor of the type comprising:

- two contact terminals and a moveable member, which can occupy, with respect to said contact terminals, either an opening position for which said contact terminals are electrically isolated from one another, or a closure position for which said moveable member ensures electrical continuity between said contact terminals; and
- a controlled device for actuating said moveable member between its two positions, said actuation device comprising a first control input for an electrical opening command and a second control input for an electrical closure command, this contactor being noteworthy in +that it incorporates, linked to said second control input for the electrical closure command, a prevention device able to prevent said moveable member from taking its closure position if the contact terminals of said contactor are simultaneously energized.

Advantageously, the electrical contactor of the invention can be such that its prevention device comprises:

- two voltage detectors, respectively linked to said contact terminals of the contactor; and
- a logic device, disposed between said voltage detectors and said second control input of the actuation device and able to prevent the closure of said contactor if said contact terminals are simultaneously energized.

Preferably, said logic device can comprise:

- a first logic gate of NAND type, whose inputs are respectively linked to said voltage detectors; and
- a second logic gate of AND type, of which an input is linked to the output of said first logic gate and of which the output is linked to said second closure control input of said actuation device, the other input of said second logic gate receiving said electrical closure command.

BRIEF DESCRIPTION OF THE DRAWING

The figures of the appended drawing will elucidate the manner in which the invention may be embodied. In these figures, identical references designate similar elements.

FIG. 3 is the electrical diagram of an exemplary logic device for the closure control of the contactors of the electrical energy distribution system of FIG. 2.

DETAILED DESCRIPTION OF THE INVENTION

Figure 1:
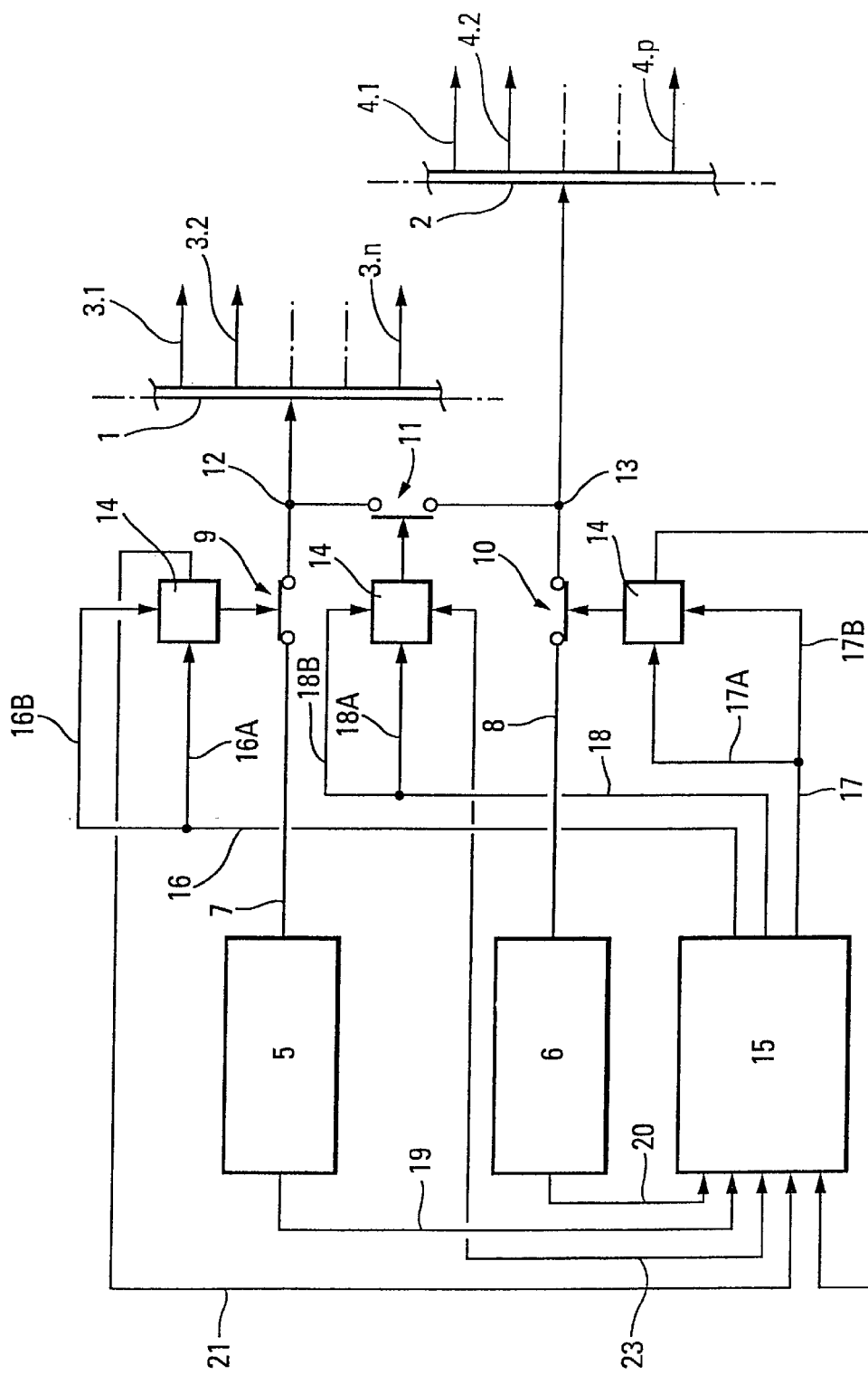
FIG. 1 shows the schematic diagram of a known electrical energy distribution system, whose structure is chosen to be especially simple deliberately.

The known electrical energy distribution system, shown in FIG. 1, exhibits, for the sake of clarity, a simple structure with only two distribution circuits. Each of these distribution circuits comprises a conducting distribution bar 1 or 2, powering in parallel a plurality of loads (not represented) by means of lines 3.1 to 3.n and 4.1 to 4.p, respectively, the indices n and p designating integer numbers.

Each conducting bar 1 or 2 is itself powered by electrical energy from an associated electrical power source 5 or 6, by way of a power line 7 or 8, on which is mounted a power contactor 9 or 10, respectively.

Additionally, an interconnection contactor 11 is provided for interlinking said power lines 7 and 8, said interconnection contactor 11 being linked, on one side, to a point 12 of the line 7, which is disposed between the power contactor 9 and the conducting bar 1 and, on the other side, to a point 13 of the line 8, which is disposed between the power contactor 10 and the conducting bar 2.

The contactors 9, 10 or 11 are of the controllable type, that is to say they can be actuated by a respective actuation member 14, said actuation members 14 themselves receiving electrical control commands from a common control device 15, via respective control links 16, 17 and 18. Each of said control links 16, 17 and 18 comprises a closure control line, 16A, 17A and 18A respectively, and an opening control line, 16B, 17B and 18B respectively.

The common control device 15, for example of the type with electromechanical or static relays, is moreover linked to the power sources 5 and 6 by lines 19 and 20, respectively, informing said common control device 15 of the state of operation of said power sources. Likewise, via lines 21, 22 and 23, said control device 15 is informed of the state, open or closed, of the contactors 9, 10 and 11, respectively.

During normal operation, that is to say when the sources 5 and 6 deliver their nominal power, the system is in the state represented in FIG. 1:

the power contactors 9 and 10 are in the closed state, in response to closure commands, delivered by the common control device 15 and transmitted respectively by the control lines 16A and 17A; and the interconnection contactor 11 is in the open state, in response to an opening command, delivered by the common control device 15 and transmitted by the control line 18B.

Thus, the bar 1 and the lines 3.1 to 3.n which are linked thereto are powered by electrical energy from the source 5, through the line 7 and the power contactor 9. Similarly, the bar 2 and the lines 4.1 to 4.p which are linked thereto are powered by electrical energy from the source 6, through the line 8 and the power contactor 10.

If, for example, the operation of the power source 5 becomes defective, this fact is detected, by virtue of the line 19, by the common control device 15 which, via the line 16B, controls the opening of the power contactor 9. As soon as the opening of the latter is confirmed to the control device 15 by way of the line 21, the latter device controls the closure of the interconnection contactor 11 by way of the line 18A. The confirmation of the closure of the interconnection contactor 11 is addressed to the common control device 15 via the line 23.

It is therefore seen that, in this known system represented in FIG. 1, the closure of the interconnection contactor 11 can occur only after awaiting confirmation, by the control device 15, of the opening of the power contactor 9 (or 10).

The electrical energy distribution system, in accordance with the present invention and illustrated by FIG. 2, comprises the same elements 1 to 14 and 16 to 20 as those described hereinabove with regard to FIG. 1, arranged in an identical manner.

The differences between the system of FIG. 2 and that of FIG. 1 are as follows:

the lines 21, 22 and 23 between, on the one hand, the actuation members 14 respectively associated with the contactors 9, 10, and 11, and, on the other hand, the control device 15, are eliminated;

in each line 16A, 17A and 18A for controlling the closure of the contactors 9, 10 and 11, respectively, is arranged a device 25, able to prevent the closure of the corresponding contactor 9, 10 or 11, if the opposite contact terminals 9a, 9b–10a, 10b–11a, 11b of said contactor are simultaneously energized; and the common control device 15 is replaced with a programmable computer 26, in which is integrated a truth table indicating, for each possible combination of the operating states of the power sources 5 and 6, the state which each contactor 9, 10 and 11 must take. In the simplified example of the system of FIG. 2, this truth table is as follows:

| | State of operation of the | | State to be taken by the | | |
|---|---|---|---|---|---|
| | Source 5 | Source 6 | Contactor 9 | Contactor 10 | Contactor 11 |
| S1 | Correct | Correct | Closed | Closed | Open |
| S2 | Correct | Defective | Closed | Open | Closed |
| S3 | Defective | Correct | Open | Closed | Closed |
| S4 | Defective | Defective | Open | Open | Open |

Situation S1 corresponds to the normal operation described hereinabove and represented in FIG. 2, while situation S4 is indicated only for consistency, since then the state of the contactors 9, 10 and 11 is immaterial.

It is thus seen that, the programmable computer 26 operating on the basis of the above truth table, and no longer sequentially, sends, in situations S2 and S3, the various closure and opening commands in accordance with said truth table directly, without being informed of the state (open or closed) of the various contactors. The operation of the system of FIG. 2, in accordance with the present invention, can therefore be particularly fast.

However, despite this speed of operation, the distribution system according to the invention is particularly safe, by virtue of the presence of the prevention devices 25 in the closure control lines 16A, 17A and 18A.

Illustrated diagrammatically in FIG. 3 is an exemplary embodiment of the prevention devices 25. This exemplary embodiment is associated with a contactor 30 (which may be one of the contactors 9, 10 or 11) provided with two opposite terminals 30a (representative of one or the other of the terminals 9a, 10a, 11a) and 30b (representative of one or the other of the terminals 9b, 10b, 11b). The moveable element 30c of the contactor 30 (similar to the moveable elements, not referenced, of the contactors 9, 10 and 11) is controlled by an actuation member 14, such as described hereinabove.

The prevention device 25 and the actuation member 14 receive their control commands from the common control device 26 by way of a control link 31 (which may be one of the control links 16, 17 or 18) comprising a closure control line 31A (representative of one or the other of the control lines 16A, 17A, 18A) and an opening control line 31B (representative of one or the other of the control lines 16B, 17B, 18B).

The opening control line 31B is linked to the opening control input 14.0 of the actuation member 14 and controls the latter directly.

The prevention device 25 comprises two voltage detectors 32 and 33, respectively linked to the terminals 30a and 30b of the contactor 30 by a line 25a or 25b. The output signals from the detectors 32 and 33 are applied to the two inputs of a NAND gate 34, whose output is applied to one of the inputs of an AND gate 35. The other input of the gate 35 is linked to the line 31A, while the output of this gate 35 is linked to the closure control input 14.F of the actuation member 14.

Thus, in the case where the two terminals 30a and 30b are simultaneously energized, the detectors 32 and 33 address a corresponding signal to the gate 34, which then disables the operation of the gate 35. If a closure command arrives on the line 31A, it may not be transmitted to the terminal 14.F, so that the actuation device 14 may not close the contactor 30.

On the other hand, it is easy to see that in all other cases, that is to say in the presence of voltage on just one of the terminals 30a, 30b or else on none, the closure command is transmitted by the gate 35.

The distribution system of FIG. 2 therefore operates as follows:

detection of the defectiveness of the source 5 (or 6) by the common control device 26 by way of the line 19 (or 20);

simultaneous sending, by this common control device 26, of the opening command for the contactor 9 (or 10) through the line 16B (or 17B) and of the closure command for the contactor 11 through the line 18A;

closure of said contactor 11 only after disappearance of any voltage on the terminal 11a (or 11b), by virtue of the action of the prevention device 25 associated with the contactor 11.

Of course, if, for example after repairing the defective source 5 (or 6), the contactor 9 (or 10) is ordered to close, it will actually only be able to close when the contactor 11 is open, since until this opening the prevention device 5 associated with said contactor 9 (or 10) detects the voltage on each of the terminals 9a, 9b (or 10a, 10b).

Figure 2:
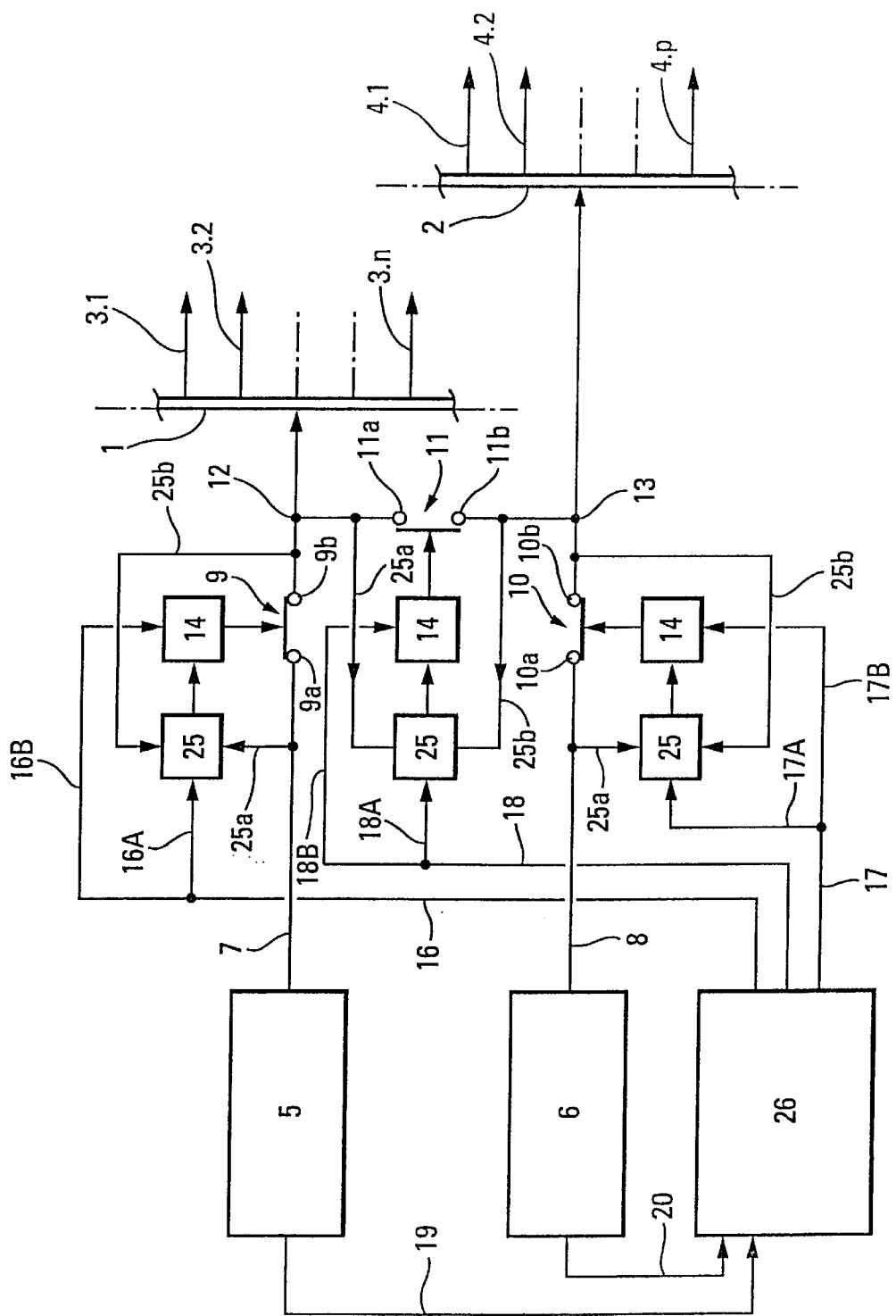
FIG. 2 illustrates, also in the form of a schematic diagram, the electrical energy distribution system of FIG. 1, improved in accordance with the present invention.

Although the exemplary distribution system according to the invention, described hereinabove and illustrated by FIG. 2, is particularly simple, it will readily be understood that the present invention is not limited to this example and relates also to distribution systems comprising a plurality of distribution circuits and a plurality of interconnection contactors.

What is claimed is:

1. An electrical energy distribution system, comprising:

a first distribution circuit which is associated with a first electrical power source powering the first distribution circuit through a first controllable power contactor;

a second distribution circuit which is associated with a second electrical power source powering the second distribution circuit through a second controllable power contactor;

a controllable interconnection contactor operable to interlink said first and second distribution circuits on a side of said first power contactor which is away from said first power source and a side of said second power contactor which is away from said second power source;

a common control device for the first and second power contactors and said interconnection contactor, said common control device being linked to said interconnection contactor by an opening control line and by a closure control line and being a programmable computer opening and closing said first and second power contactors and said interconnection contactor, without prior checking of open state or closed state of said first and second power contactors and said interconnection contactor, according to a truth table indicating, for each possible combination of operating states, correct or defective, of said first and second electrical power sources, the open or closed state which each of said first and second power contactors and said interconnection contactor must take; and a prevention device associated with said interconnection contactor and operable to prevent a closure of said interconnection contactor if its contact terminals are simultaneously energized, said prevention device being interposed in said closure control line of said interconnection contactor.

2. The electrical energy distribution system of claim 1, further comprising a first prevention device associated with said first power contactor and being operable to prevent a closure of said first power contactor if its contact terminals are simultaneously energized and a second prevention device associated with said second power contactor and being operable to prevent a closure of said second power contactor if its contact terminals are simultaneously energized.

3. The electrical energy distribution system of claim 2, wherein said common control device is linked to each of said first and second power contactors by an opening control line and by a closure control line, wherein said first prevention device is interposed in said closure control line of the first power contactor and said second prevention device is interposed in said closure control line of the second power contactor.

4. The electrical energy distribution system of claim 1, wherein said prevention device comprises:

two voltage detectors, respectively linked to said contact terminals of the interconnection contactor; and a logic device, linked to said closure control line and preventing closure of the interconnection contactor if its contact terminals are simultaneously energized.

5. The electrical energy distribution system of claim 3, wherein each of said first and second prevention devices and said prevention device of said interconnection contactor comprises:

two voltage detectors, respectively linked to said contact terminals of the corresponding power or interconnection contactor; and a logic device, linked to said closure control line of the corresponding power or interconnection contactor and preventing the closure of the corresponding power or interconnection contactor if its contact terminals are simultaneously energized.

* * * * *